June 19, 1962 N. L. FRANCIS 3,039,585
RAIL STORAGE AND TRANSFER DEVICE
Filed April 8, 1959 2 Sheets-Sheet 1

INVENTOR
NORMAN L. FRANCIS
BY
Mason, Kolehmainen, Rathburn and Wyss
ATTORNEYS

United States Patent Office 3,039,585
Patented June 19, 1962

3,039,585
RAIL STORAGE AND TRANSFER DEVICE
Norman L. Francis, Birmingham, Ala., assignor to Chemetron Corporation, Chicago, Ill., a corporation of Delaware
Filed Apr. 8, 1959, Ser. No. 804,991
17 Claims. (Cl. 198—20)

The present invention relates generally to rail handling equipment for use in a system for forming a continuous rail by welding individual rail sections together in end to end relationship and is more particularly concerned with new and improved apparatus for storing a plurality of rail sections and for supplying these sections one at a time when called upon to do so.

The apparatus of the present invention is especially well suited for use in a rail forming system of the type described in copending application Serial No. 808,786, filed April 24, 1959, and assigned to the same assignee as the present invention. As is described in detail in the latter application rail sections must be supplied to the welding apparatus one at a time and in sequence as they are used up in the formation of a continuous rail. In prior arrangements the rail sections have often been fed to the welding apparatus by using a crane or other similar equipment to lay the rail section on rollers where they are manually pushed into the welder. This procedure not only ties up the crane so that it is not available for performing other work but also very often slows down the rail forming process since it is frequently necessary to await the crane operation before the next weld can be made. It would, therefore, be desirable to provide apparatus for supplying rail sections automatically and one at a time whenever the need arises and the satisfaction of this desire constitutes one of the primary objects of the present invention.

Another object of the invention is to provide a new and improved rail transfer device for storing a plurality of rail sections and for supplying these rail sections one at a time, thereby avoiding the necessity for any manual handling of the rail sections.

A further object of the invention is to provide rail handling equipment containing a row of side by side rail sections and including mechanism for simultaneously removing the end rail section in the row and advancing the entire row to set up the next cycle of operation.

The invention has for another object the provision of rail handling equipment of the character described above, the operation of which is automatically terminated after the rail section has been supplied and after the row of rail sections has been advanced to a position awaiting the next cycle of operation.

The foregoing and other objects are realized, in accordance with the present invention, by providing a rail transfer apparatus for supplying rail sections one at a time and in sequence to power driven rollers which in turn advance the rail section to the welding apparatus. The rail transfer apparatus comprises a pair of identical units cooperating to form a storage bed for a row of rail sections oriented in contiguous side by side relationship. The two units are operated in synchronism and each includes a stop for engaging the end rail section in the row and a transfer plate movable into engagement with the end rail section in the row to lift the latter free of the stop and to deposit it upon the power driven rollers. Movement of the transfer plate is also effective to drive a conveyor belt on the storage bed in each unit in order to advance the rail sections until the row end section engages the stop. The cycle is terminated after the rail section is deposited on the power driven rollers by engagement of the transfer plate with a limit switch which is effective to shut off the power to the drive mechanism for the plate.

The invention both as to its organization and manner of operation together with further objects and advantages will best be understood by reference to the following detailed description taken in conjunction with the accompanying drawings wherein.

Figure 1:
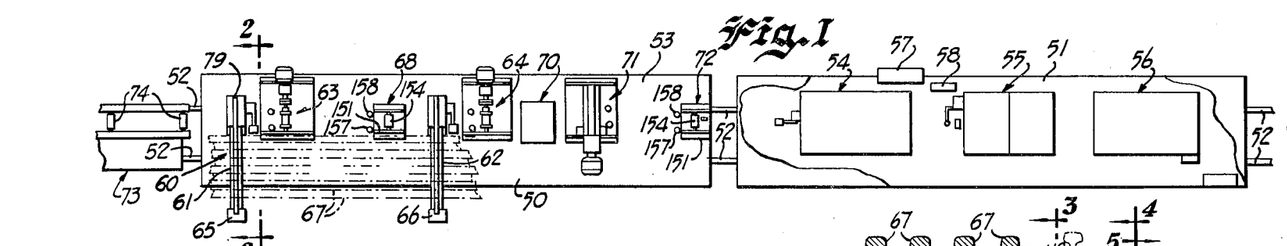
FIG. 1 is a plan view showing somewhat schematically the weld forming apparatus of the present invention.

Referring now to the drawings and more particularly to FIG. 1, the rail forming apparatus of the present invention is there illustrated as installed upon a pair of railroad cars 50 and 51 braked in position upon a railroad track 52. The equipment illustrated as being mounted on the car 50 may also be installed on concrete foundations or other fixed support means anchored to the ground but when a rail feeding car, such as the car 50 is employed, it takes the form of a conventional flat car having an upper horizontal car bed 53 for supporting the apparatus for feeding rail sections one at a time to the welding car 51. The car 51 preferably comprises a covered car housing welding and shearing apparatus indicated generally by the reference numeral 54, grinding equipment indicated generally by the reference numeral 55 and a pusher mechanism indicated generally by the reference numeral 56.

The welding car 51 also houses a main control panel or box identified by the reference numeral 57 and a control sequence panel or box indicated at 58 both of which are controlled by the weld operator. Generally, the main control box contains the various push buttons and controls necessary to operate the equipment while the control sequence box contains such items as indicating lights to keep the operator informed of the operation of the various system components and also to apprise the operator of the progress being made during each cycle of operation.

The rail feeding equipment includes a rail storage and transfer apparatus 60 which actually includes two units 61 and 62 of similar construction coacting to form a storage bed containing a row of rail sections oriented in contiguous, side by side relationship together with suitable mechanism for transferring these rail sections one at a time onto a pair of power driven rollers indicated by the reference numerals 63 and 64. The units 61 and 62 are illustrated as being supported at one end upon the rail feeding car 50 and at the other end are provided with supports respectively indicated by the reference numerals 65 and 66 extending downwardly into engagement with the ground. The units 61 and 62 may be located on either side of the power driven rollers 63 and 64 so that the rail sections can be fed either upwardly or downwardly as viewed in FIG. 1. The rail sections, which are indicated by the reference numeral 67, are loaded onto the rail storage and transfer device 60 by means of cranes or other mechanical rail handling equipment and the rail sections are replaced as they are used up during production of the continuous rail so that a supply of rails will at all times be available on the storage bed. If necessary, the butt ends of the rails may be ground or otherwise cleaned to remove rust or scale prior to delivering the rail sections to the power driven rollers 63 and 64. As indicated previously, the storage and transfer device functions to lift the rail sections one at a time from the row of supply rails and to deposit the lifted section onto the power driven rollers 63 and 64. One or more idler rollers of the type indicated by the reference numeral 68 may be employed to provide further support for the rail section.

After the rail section is delivered from the transfer and storage device 60 the power driven rollers 63 and 64 serve to advance the rail section past a spot grinder indicated at 70 which functions to grind the bottom surface of the base and the running surface of the rail head near the leading and trailing ends of the rail section so that these ground areas will provide good contact surfaces for receiving the welding electrodes employed in the welding apparatus 54. The rail section is advanced through the spot grinder and is delivered to the welding apparatus by a power driven roller 71 which includes a top squeeze roller acting upon the running surface of the rail section to hold the latter in position while the rail section is being fed into the welding apparatus. The rail section passes into the welding apparatus over the idler roller 72 which is illustrated as being disposed at the forward end of the rail feeding car 50. The rail section entering the welding apparatus 54 is moved adjacent the end of the continuous rail formed by prior welds and the two abutting ends are joined together by an electric flash type welding operation. During this operation the rail section 67 is reciprocated so that its end is moved toward or away from the butt end of the continuous rail, thus flashing and uniformly heating the rail ends to raise the temperature of the metal near the melting point whereupon the rail section 67 is forced vigorously against the butt end of the continuous rail. The rail ends are thus joined by the flow of metal therebetween and an upset of metal is formed around the joint by the force applied to the rail section 67. When the welding operation is completed, a shear block is rendered automatically effective to remove a major portion of this upset metal. The weld operator then uses a pair of tongs to remove the ring of hot metal sheared off and the welded joint then passes at relatively high speed to the grinding equipment 55 where the remainder of the weld metal is removed while the weld is still hot and soft.

The continuous rail is passed through the grinding equipment 55 by the pusher mechanism 56 which forces the rail outwardly from the forward end of the welding car 51 and moves it along a flat car disposed at the right end of the car 51 as viewed in FIG. 1. This flat car contains a weld testing station housing suitable equipment for checking or testing the weld as, for example, by using a conventional magnaflux test procedure. In the event that a defective weld is found at the test station the test station operator operates a push button switch to illuminate an indicating light on the control sequence box 58 so that the weld operator can operate suitable controls for backing up the continuous rail. This backup operation is performed by reversing the direction of drive of the pusher mechanism 56 and by reversing the drive of the power driven rollers 63, 64 and 71. During the backup operation, the end of the continuous rail is forced along the idler roller 72, along the power driven rollers 63, 64 and 71 and along the idler rollers 68 until it passes to suitable backup support structure located at the left end of the rail feeding car 50 as viewed in FIG. 1 and indicated generally by the reference numeral 73. This backup support structure preferably includes a series of idler rolls 74 which permit the continuous rail to be backed up until the defective weld has been moved past the grinding equipment 55. The rail is then cut by using an oxyacetylene torch or the like to remove the defective weld section and the cut portions of the rail are then backed up still further and are thereafter joined together by operating the welding apparatus 54 in the manner indicated above.

Figure 2:
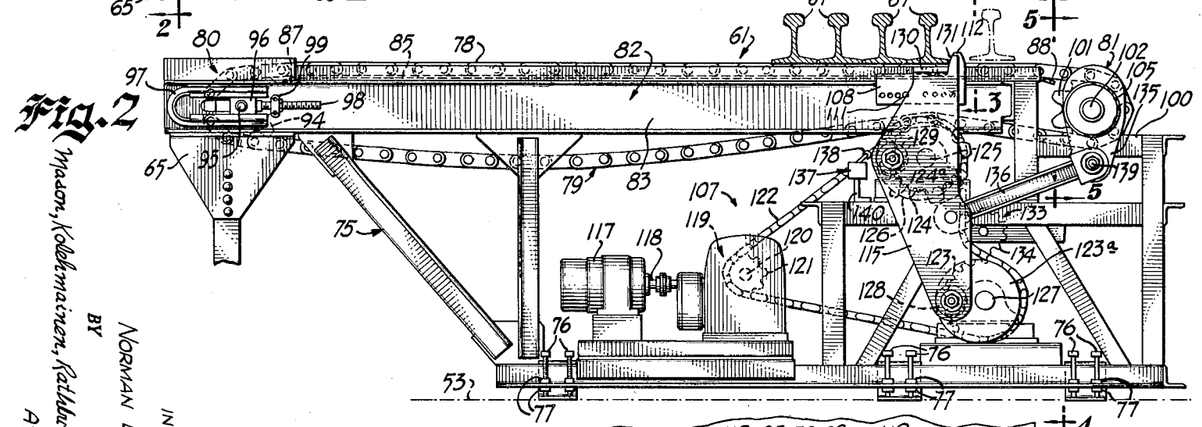
FIG. 2 is an enlarged sectional view taken along a line substantially corresponding to the line 2—2 in FIG. 1 and shows particularly the rail transfer apparatus for lifting the rail sections from the storage bed onto the powered rollers on the rail supply car.

As indicated above the rail storage and transfer device 60 comprises two identical units 61 and 62 mounted in spaced apart relationship extending parallel to each other and cooperating to form a storage bed for supporting a supply of the rail sections 67 in side by side relationship as shown in FIGS. 1 and 2. The two units 61 and 62 are so spaced that they provide adequate support for the entire row of rail sections but are nevertheless capable of holding even the shortest rail sections supplied to the system. Since these units are identical only one, namely, the unit 61, will be described in detail. This unit is shown in FIGS. 2 to 7, inclusive, of the drawings and includes a rigid frame 75 which, in the form of the invention shown, is bolted or otherwise secured in fixed position upon the floor 53 of the rail supply car near one end of the frame. The other end of the unit 61 is supported above ground level by the supporting structure 65 referred to above. The frame 75 may be raised or lowered with respect to the floor surface 53 by means of adjusting bolts 76 threaded through suitable nuts 77 welded to the frame. The bolts 76 are adjusted so that an upper rail supporting surface or storage bed 78 of the unit 61 is substantially level, is also level with a similar bed on the unit 62, and is disposed at the proper height for holding the rail sections for deposit upon the power driven rollers 63 and 64.

Figure 3:
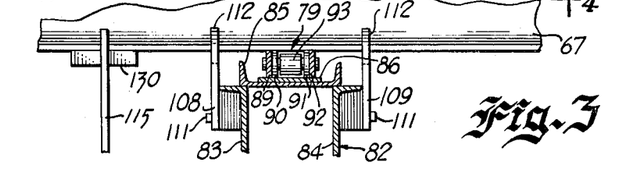
FIG. 3 is an enlarged fragmentary sectional view taken along a line substantially corresponding to the line 3—3 in FIG. 2 and shows particularly the mechanism for lifting the rail section from the storage bed onto the power driven rollers.

The rail sections are advanced along the unit 61 from left to right as viewed in FIG. 2 by means of an endless chain 79 having its opposed ends trained over sprocket assemblies 80 and 81 respectively carried at opposed ends of the frame 75. More specifically, the sprocket assembly 80 is supported upon the left end of an elongated horizontal channel 82 forming a part of the frame 75. As is best shown in FIG. 3 of the drawings, the channel 82 is formed by a pair of side plates or beams 83 and 84 secured to an upper channel plate 85. A hardened wear plate 86 is secured to the upper face and within the channel of the plate 85 and is provided with end portions 87 and 88 extending slightly beyond the ends of the plate 85. These end portions are bent downwardly to permit the chain 79 to enter and leave the upper channel 82. The chain 79, as is best shown in FIGS. 2, 3, 4 and 5, comprises a series of pivotally interconnected links 89 an 90 extending along one side of the chain and a similar set of links 91 and 92 forming the other side of the chain. Bushed rollers 93 interconnect the chain links and provide pivots for each link pair. The chain links are adapted to be moved along the upper surface of the wear plate 86 in a manner described more fully below and these links engage the undersides or bottoms of the bases of all of the rail sections 67 in the row disposed on the storage bed 78.

A sprocket assembly 80, as is shown in FIG. 2, includes a toothed sprocket 94 mounted upon a small shaft 95 having its opposed ends journaled within bearing blocks 96. Each of the bearing blocks is adjustably mounted within a guide channel formed between one of the side plates of the channel 82 and a fixed guide bracket 97 suitably secured to this side plate. For the purpose of adjusting the tension on the endless chain 79, the bearing blocks 96 may be moved within their associated guide channels by turning an adjusting screw 98 which is threaded through a block 99 secured to the upper channel 82 and has its inner end connected to move the bearing blocks as the screw is turned.

Figure 5:
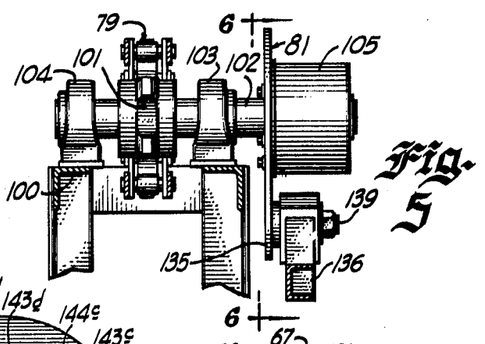
FIG. 5 is an enlarged, fragmentary view taken along a line substantially corresponding to line 5—5 in FIG. 2.

The sprocket assembly 81 is mounted upon a platform 100 formed at the right side of the frame 75 as viewed in FIG. 2. As is best shown in FIG. 5, this assembly includes a central sprocket 101 having peripheral teeth in engagement with the chain 79. The sprocket is mounted upon a shaft 102 rotatably supported upon pillow bearings 103 and 104. One end of the shaft 102 is connected to one of the drive elements of a conventional one way clutch 105 which is adapted to be driven by a drive mechanism indicated generally by the reference numeral 107 in order to advance the rail sections along the horizontal storage bed 78 in a manner which will become evident as the description proceeds.

For the purpose of stopping the advancement of the rail sections in order to hold the rail section at the right end of the row as viewed in FIG. 2 in position to be deposited upon the power driven rollers 63 and 64, there are provided a pair of adjustable stop plates 108 and 109 of identical construction. Each stop plate includes a main body portion having a series of horizontally aligned openings therein for receiving attaching bolts 111 which serve to hold the stop plate in position. To this end, the stop plate 108 is secured to the side plate 83 by threading the bolts 111 into appropriate tapped openings formed in the latter plate and in similar manner, the guide plate 109 is secured to the side plate 84 by threading the attaching screw into tapped openings formed in the side plate 84. Each of the plates 108 and 109 includes an upwardly extending indexing tab 112 disposed in the path of movement of the rail sections 67 as the latter are advanced from left to right as viewed in FIG. 1. Thus, when the rail sections are moved to the right, the rail section at the right end of the line engages the indexing tabs 112 on the two stop plates and is held in proper position for transfer to the power driven rollers. The latter transfer is accomplished by means of a transfer plate 115 driven by the drive mechanism 107 which includes an electric motor 117 having its output shaft 118 connected through suitable reduction gearing indicated generally by the reference numeral 119 to drive a shaft 120. The latter shaft carries a sprocket 121 in engagement with an endless chain 122 which is trained over suitable sprockets 123 and 124 mounted for rotation upon the frame 75. For the purpose of maintaining synchronism between eccentric plates 123a and 124a decribed more fully below, there is provided an idler sprocket assembly 133 adjustably mounted on the frame 75. This assembly includes a sprocket 134 having teeth engaging the chain 122 and adjustable to alter the synchronism of the eccentric plates by a suitable adjusting mechanism which is not visible in the drawings.

Figure 4:
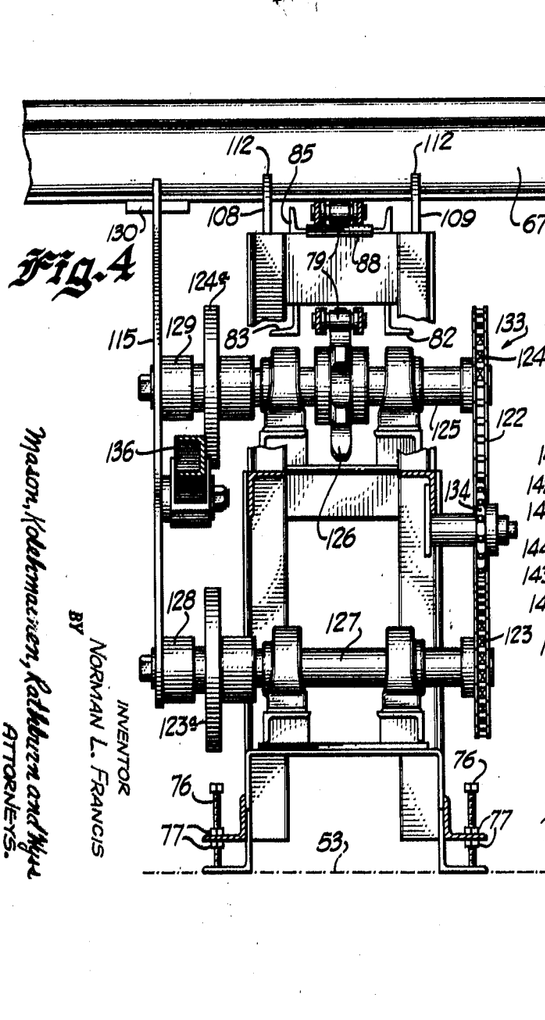
FIG. 4 is an enlarged sectional view taken along a line substantially corresponding to line 4—4 in FIG. 2.

As is best shown in FIG. 4, the sprocket 124 is secured to a shaft 125 which also supports an idler sprocket 126 engaging the underside of the chain 79 in order to prevent excessive sag of the lower chain run. The sprocket 126 carries at its center a bearing hub which permits free rotation of the sprocket upon the shaft 125 so that this sprocket does not drive the chain 79. The sprocket 124 is, of course, secured to rotate both the shaft 125 and the eccentric plate 124a which is mounted upon the latter shaft. In similar manner, the sprocket 123 turns its mounting shaft 127 to rotate the eccentric plate 123a.

The transfer plate 115 is connected to the drive mechanism 107 by means of eccentric connecting assemblies 128 and 129 respectively attached to the eccentric plates 123a and 124a. The eccentric connecting assemblies are constructed to permit relative rotation between the eccentric plates and the transfer plate 115 and, hence, they serve to move the transfer plate within a restricted path when the motor 117 is actuated. More specifically, the drive mechanism 107 is so constructed that the sprockets 121, 123 and 124 rotate in a clockwise direction as viewed in FIG. 2 and, when this rotation occurs, the transfer plate is raised from the position shown in FIG. 2 and is also moved to the right until the eccentrics 128 and 129 would reach a point where they are disposed vertically above the shafts 125 and 127. As the drive sprockets continue to rotate the transfer plate moves further to the right and is lowered until the eccentrics reach a position where they are horizontally aligned with the shafts 125 and 127. Further rotation of the drive sprockets 123 and 124 lowers the transfer plate 115 and moves it to the left until the eccentrics reach a position where they are located vertically below the drive shafts 125 and 127. Continued rotation of the drive sprockets 123 and 124 raises the transfer plate 115 and moves it further to the left until it reaches the position shown in FIG. 1. At this point, the transfer plate has completed one cycle. When the transfer plate moves along the described path, a horizontal shelf 130 carried near its upper end engages the bottom of the base of the rail section 67 disposed at the right end of the line and lifts this rail section upwardly. To hold the rail section on the shelf, the transfer plate is provided with a raised stop 131 extending upwardly near the shelf 130. When the rail section is lifted, it is guided over the indexing tabs 112 on the stop plates 108 and 109 and, when the transfer plate shelf 130 descends, the rail section is lowered onto the power driven rollers 63 and 64. These rollers hold the rail section while the transfer plate 115 is lowered to move the shelf 130 out of engagement with the rail section base.

In order to advance the line of rail sections from left to right along the storage bed 78, the movement of the transfer plate 115 is used to drive the sprocket 101 of the sprocket assembly 81. More specifically, when the transfer plate moves through its cycle to lift the end rail section in the row onto the power driven rollers in the manner described above, a connecting rod 136 pivotally connected at one end to the transfer plate 115 and pivotally connected at its other end to an indexing plate 135 transmits the movement of the transfer plate to pivot the indexing plate 135 first in one direction and then in the reverse direction as the transfer plate moves through one complete cycle. The indexing plate 135 is, in turn, connected to drive the one way clutch 105 and the arrangement is such that rotation of the indexing plate in a clockwise direction as viewed in FIG. 2 turns the shaft 102 and the sprocket 101 in a clockwise direction in order to advance the chain 79 along the wear plate 86 from left to right, thus carrying all of the rail sections positioned on the storage bed 78 for a distance equal to the width of the base of one rail section so that the rail section at the right end of the line engages the indexing tabs 112 on the stop plates 108 and 109 to replace the rail section lifted by the transfer plate 115. When the end rail section engages the stop plates it is in position to be transferred to the power driven rollers 63 and 64 during the next cycle of operation of the transfer plate. When the indexing plate 135 is driven in a counterclockwise direction by movement of the connecting rod 136, the one way clutch 105 overruns and, hence, the drive sprocket 101 is not turned. A limit switch 137 is mounted adjacent the path of movement of the transfer plate 115 in order to provide a control signal for automatically terminating the operation of the transfer device after the transfer plate has moved through one complete cycle. This limit switch 137 is mounted in fixed position upon a bracket 140 on the frame 75 and it includes an actuating arm 138 carrying at its free end a roller disposed in the path of movement of the transfer plate 115.

Figure 7:
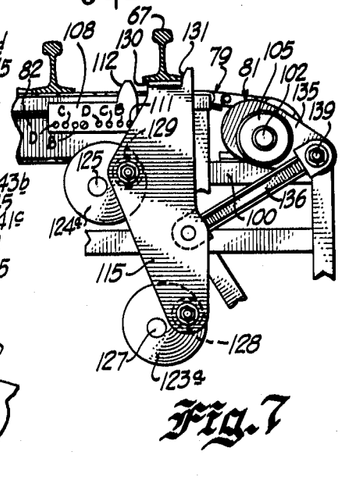
FIG. 7 is a fragmentary view showing the transfer apparatus in a different position from that shown in FIG. 2.

Rail sections of different cross sectional dimensions are used on different railroad lines in this country and, as a consequence, at a given location the apparatus of the present invention will generally be called upon to handle only a single type rail section having a predetermined cross section, when the apparatus is transported to other locations perhaps on a different rail line, a different type of rail section having different cross section dimensions may be encountered. It is, of course, desirable that the apparatus be adjusted to handle these different sized rails. The rail sections may also vary somewhat in length but these variations have no effect on the operation of the rail storage and transfer apparatus 60 since as indicated previously, the two units 61 and 62 are placed sufficiently close together to receive any of the usual lengths of rails. Any variations in the width of the rail base, however, must be taken into consideration due to the fact that the transfer plate 115 must deposit the rail section with its center line located at the center of the power driven rollers 63 and 64 and the idler roller 68. The center line of the latter rollers is, of course, fixed as is the stroke of the transfer plate and, hence, when rail sections having different base widths are employed, it is necessary that the end rail section in the line on the storage bed 78 be stopped at the proper position to permit the transfer plate to deposit the end rail section at exactly the right position on the power driven and idler rolls on the rail feeding car. To this end, the stop plates 108 and 109 may be moved to the left or right as viewed in FIGS. 2 and 7 by removing the attaching bolts 111 and thereafter moving the stop plates so that different ones of the apertures in these plates are aligned with tapped openings in the side plates of the upper channel 82. By proper selection of the aligned holes, the stop plates 108 and 109 can be moved to the left or to the right as viewed in FIG. 2 to change the position of the indexing tabs 112. The stop plates 108 and 109 are moved to the left when rail sections having smaller base widths are employed and, when the proper adjustment has been made, the attaching bolts are again inserted through the aligned openings to lock the plates in position. In FIGS. 2 and 7, the stop plates 108 and 109 are positioned for the widest base rail sections which, for convenience, will be referred to as type A sections. This position is established when the two bolts 111 are inserted within the two holes indicated in FIG. 7. When the plates 108 and 109 are moved one step to the right so that the bolts 111 are disposed within the holes marked B, the stop plates are positioned for the next widest base rails which will be referred to as B type sections. Similarly, when the stop plates are moved an additional step to the right, the bolts 111 are disposed within holes C and the apparatus is set up to handle C type rail sections. Finally, when the bolts 111 extend through holes D, the apparatus is conditioned to handle the narrowest base rails which may be referred to as D type sections.

Figure 6:
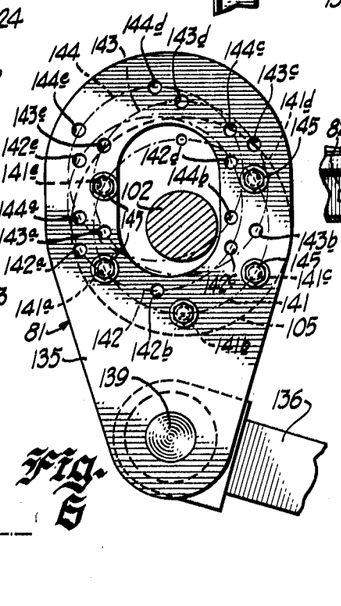
FIG. 6 is an enlarged fragmentary view taken along a line substantially corresponding to line 6—6 in FIG. 5 and shows particularly an index plate for adjusting the transfer device to handle rail sections of different size.

Since the drive sprocket 101 is adapted to move the chain 79 through a distance corresponding approximately to the width of the base of one rail section during each cycle of operation of the transfer, it also becomes necessary to adjust the stroke of the indexing plate in order to compensate for the different base widths when different rail sections are supplied. To this end, as is best shown in FIG. 6, the indexing plate 135 is provided with a plurality of spaced apart apertures for receiving bolts 145 which serve to attach the indexing plate to the one way clutch 105. The apertures in the indexing plate are arranged along four different circles with each circle corresponding to one of the four rail sizes discussed above. More specifically, apertures 141a, 141b, 141c, 141d and 141e are arranged along an imaginary bolt circle 141 and when the attaching bolts 145 are inserted through these five apertures the equipment is set up to handle the widest rail base or type A sections since the effective length between the center of the shaft 102 and the center of the pivot pin 139 is at this time at a minimum and, as a result, the reciprocation of the connecting rod 136 induces a maximum angular rotation of the shaft 102. Therefore, the drive sprocket 101 is driven through its maximum angle during each cycle of operation of the transfer plate so that the chain 79 is moved along the wear plate 86 for a distance sufficient to move the wide base rails into engagement with the indexing tabs 112 on the stop plates 108 and 109. Similarly, apertures 142a, 142b, 142c, 142d and 142e are arranged along an imaginary bolt circle 142 and this set of apertures is used when the type B rail sections are employed. Apertures 143a, 143b, 143c, 143d and 143e are arranged along an imaginary bolt circle 143 and when the bolts are inserted through these apertures, the apparatus is set up to handle the type C rail sections. Finally, apertures 144a, 144b, 144c, 144d and 144e are arranged along an imaginary bolt circle 144 and the attaching bolts 145 are inserted through this set of apertures when it is desired to adjust the apparatus to handle the type D rail sections having the narrowest rail bases. At any given location of the rail forming equipment, it is likely that a single adjustment will be sufficient to handle all of the rail sections encountered and, in any event, the adjustment need be made very infrequently since the equipment is generally used for long periods of time with rail sections of substantially the same cross sectional dimensions being supplied.

In view of the foregoing description, it will be observed that a single drive mechanism is effective to operate the transfer plate 115 to deposit a rail section on the power driven rollers and is also effective to advance the entire row of rail sections by movement of the endless chain 79. Thus, the equipment required to perform both functions is relatively simple in construction, is economical to manufacture and is rugged and durable in operation.

While there has been illustrated a particular embodiment of the present invention, it should be understood that many modifications will be apparent to those skilled in the art and it is therefore intended in the appended claims to cover all such modifications falling within the true spirit and scope of the invention.

What is claimed as new and is desired to be secured by Letters Patent of the United States is:

1. Rail transfer apparatus for delivering rail sections one at a time to a rail receiving device, said apparatus comprising means defining a storage bed for supporting a row of rail sections oriented in side by side relationship with their flat base portions resting on said storage bed, an endless chain extending beneath said storage bed and engaging the rail sections, first and second sprocket assemblies supporting said chain, stop means disposed adjacent the storage bed for engaging the end rail section in the row in order to hold the rail sections in position upon the storage bed, said stop means including a rail guiding surface extending upwardly from the storage bed, a transfer plate mounted beneath the storage bed and including a flat ledge portion engageable with the flat bottom of the rail section, drive means for moving said transfer plate upwardly to bring said flat portion into engagement with the end rail section and to lift it along the rail guiding surface with its flat base remaining substantially parallel with the storage bed until the end rail section reaches a position free from the stop means and for then lowering the end rail section onto the rail receiving device with its flat base portion resting on said device, and drive transfer means connecting the transfer plate to the first sprocket assembly, said drive transfer means including an index plate, a connecting arm pivotally connected both to the index plate and to the transfer plate in order to oscillate the index plate when the transfer plate is driven by said drive means, and a one way clutch connected between the index plate and the first sprocket assembly, said clutch being effective to provide a drive connection to said first sprocket assembly when the index plate oscillates in one direction, thereby to drive said chain and move the entire row of rail sections along said storage bed until the new end rail section engages the stop means to replace the rail section raised by the transfer plate, said clutch being ineffective to provide the drive connection when the index plate oscillates in the reverse direction.

2. The apparatus defined by claim 1 wherein the stop means is adjustably mounted upon the means defining the storage bed and wherein the index plate is adjustably connected to the one way clutch, the adjustments of the stop means and the index plate being effective to permit the rail transfer apparatus to handle rail sections of different cross sectional dimensions.

3. Rail transfer apparatus for delivering rail sections one at a time to a rail receiving device, said apparatus comprising means defining a storage bed for supporting a row of rail sections oriented in side by side relationship with their flat base portions resting on said storage bed, an endless conveyor extending beneath said storage bed and engaging the rail sections, conveyor supporting assembly for supporting said conveyor for movement with respect to the storage bed in order to advance the row of rail sections, stop means disposed adjacent the storage bed for engaging the end rail section in the row in order to hold the rail sections in position upon the storage bed, said stop means including a rail guiding surface extending upwardly from the storage bed and including means thereon for engaging the underside of the flat base portion of the rail sections, a transfer plate mounted beneath the storage bed, drive means for moving said transfer plate upwardly to bring the engaging means into engagement with the flat base portion of the end rail section and to move the latter rail section along the rail guiding surface with its flat base remaining generally horizontal until said end rail section reaches a position free from the stop means and for then lowering the end rail section until its flat base portion rests upon the rail receiving device, and drive transfer means connecting the transfer plate to the conveyor supporting assembly, said drive transfer means including an index plate, a connecting arm pivotally connected both to the index plate and to the transfer plate in order to oscillate the index plate when the transfer plate is driven by said drive means, and a one way clutch connected between the index plate and the conveyor supporting assembly, said clutch being effective to provide a drive connection to said conveyor supporting assembly when the index plate oscillates in one direction, thereby to drive said conveyor and move the entire row of rail sections along said storage bed until the new end rail section engages the stop means to replace the rail section raised by the transfer plate, said clutch being ineffective to establish the drive connection when the index plate oscillates in the reverse direction.

4. Rail transfer apparatus for delivering rail sections one at a time to a rail receiving device, said apparatus comprising means defining a storage bed for supporting a row of rail sections oriented in side by side relationship with their flat base portions resting on said storage bed, an endless chain extending beneath said storage bed and engaging the rail sections, first and second sprocket assemblies supporting said chain, stop means disposed adjacent the storage bed for engaging the end rail section in the row in order to hold the rail sections in position upon the storage bed, a transfer plate mounted beneath the storage bed and including means thereon for engaging the underside of the flat base portion of the rail sections, drive means for moving said transfer plate in an orbital path about a predetermined axis in order to move the plate upwardly until the engaging means thereon engages the flat base portion and lifts the end rail section until it reaches a position free from the stop means and for then lowering the end rail section until its flat base portion rests upon the rail receiving device, and drive transfer means connecting the transfer plate to the first sprocket assembly, said drive transfer means including an index plate connected to the transfer plate for oscillatory movement when the transfer plate is driven by said drive means, and a one way clutch connected between the index plate and the first sprocket assembly, said clutch being effective to provide a drive connection to said first sprocket assembly when the index plate oscillates in one direction, thereby to drive said chain and move the entire row of rail sections along said storage bed until the new end rail section engages the stop means to replace the rail section raised by the transfer plate, said clutch being ineffective to provide the drive connection when the index plate oscillates in the reverse direction.

5. The apparatus defined by claim 4 wherein the stop means is adjustably mounted upon the means defining the storage bed and wherein the index plate is adjustably connected to the one way clutch, the adjustments of the stop means and the index plate being effective to permit the rail transfer apparatus to handle rail sections of different cross sectional dimensions.

6. Rail transfer apparatus for delivering rail sections one at a time to a rail receiving device, said apparatus comprising means defining a storage bed for supporting a row of rail sections oriented in side by side relationship with their flat base portions resting on said storage bed, an endless conveyor extending beneath said storage bed and engaging the rail sections, conveyor supporting means supporting said conveyor for movement with respect to the storage bed in order to advance the entire row of rail sections, stop means disposed adjacent the storage bed for engaging the end rail section in the row to hold the rail sections in position in the storage bed, a transfer plate mounted for orbital movement about a predetermined axis disposed beneath the storage bed, drive means for moving said transfer plate through its orbital movement so that during a complete cycle it moves upwardly to pick up the end rail section, then moves the rail section until the rail section reaches a position free from the stop means, then lowers the end rail section until the flat base portion thereof rests upon the rail receiving device and finally returns to its original position, and drive transfer means connecting the transfer plate to the conveyor supporting means, said drive transfer means including a one way clutch effective to establish a drive connection from the drive means to said first sprocket assembly during only a portion of the cycle of the transfer plate, thereby to drive said conveyor and move the entire row of rail sections along said storage bed until the new end rail section engages the stop means to replace the rail section raised by the transfer plate, said clutch being ineffective to provide the drive connection during the remainder of the cycle of the transfer plate.

7. Rail transfer apparatus for delivering rail sections one at a time to a rail receiving device, said apparatus comprising means defining a storage bed for supporting a row of rail sections oriented in side by side relationship with their flat base portions resting on said storage bed, an endless conveyor extending beneath said storage bed and engaging the rail sections, conveyor supporting means supporting said conveyor for movement with respect to the storage bed in order to advance the entire row of rail sections, stop means disposed adjacent the storage bed for engaging the end rail section in the row in order to hold the rail sections in position upon the storage bed, said stop means including a rail guiding surface extending upwardly from the storage bed, a transfer plate mounted for movement in an orbital path about a predetermined axis disposed beneath the storage bed, drive means for moving said transfer plate through its orbital path so that during a complete cycle it moves upwardly to pick up the end rail section and moves the latter along the rail guiding surface until the end rail section reaches a position free from the stop plate and then lowers the end rail section with the flat base portion resting upon the rail receiving device, and drive transfer means connecting the transfer plate to the conveyor supporting means in order to move the entire row of rail sections along said storage bed until the new end rail section engages the stop means thereby replacing the rail section raised by the transfer plate.

8. Rail transfer apparatus for delivering rail sections one at a time to a rail receiving device, said apparatus comprising means defining a storage bed for supporting a row of rail sections oriented in side by said relationship with their flat base portions resting on said storage bed, a conveyor extending beneath said storage bed and engaging the rail sections, conveyor supporting means supporting said conveyor for movement with respect to the storage bed in order to advance the entire row of rail sections, stop means disposed adjacent the storage bed for engaging the end rail section in the row in order to hold the rail sections in position upon the storage bed, a transfer plate mounted for movement in an orbital path about a horizontal axis disposed beneath the storage bed, drive means for moving said transfer plate in said path so that during a complete cycle it moves upwardly to pick up the end rail section and to move said end rail section until it reaches a position free from the stop plate and then lowers the end rail section until its flat base portion rests upon the rail receiving device, and drive transfer means connecting the transfer plate to the conveyor supporting means in order to move the entire row of rail sections along said storage bed until the new end rail section engages the stop means to replace the rail section raised by the transfer plate.

9. Rail transfer apparatus for delivering rail sections one at a time to a support bed on rail receiving equipment, said apparatus comprising storage means including a movable conveyor for supporting a row of rail sections in upright side by side relationship with a flat base portion thereof engaging said conveyor, transfer means movable between a retracted position where it is out of engagement with the rail sections to an advanced position where it removes one of the rail sections from the storage means and then to a position below the level of the support bed for depositing the removed section with said base portion of the latter resting on the support bed of the rail receiving equipment, and drive means moving the transfer device and driving said conveyor for moving the row of rail sections after the transfer device removes said one rail section.

10. Rail transfer apparatus for delivering rail sections one at a time to a support bed on rail receiving equipment, said apparatus comprising storage means including a movable conveyor for supporting a row of rail sections in upright side by side relationship with a flat base portion thereof engaging said conveyor, stop means for engaging the end rail section in the row in order to position the entire row upon the storage means, transfer means movable between a retracted position where it is out of engagement with the rail sections to an advanced position where it lifts the rail section engaged by the stop means and then to a position below the level of the support bed for depositing the removed section with the flat base portion of the latter resting on the support bed of the rail receiving equipment, and drive means moving the transfer device and driving said conveyor in step by step fashion in order for advancing the row of rail sections after each end section is removed until the new end section engages the stop means to replace the removed rail section.

11. The apparatus defined by claim 10 wherein means are provided for adjusting the position of the stop means along the path of advancement of the row of rail sections and for adjusting the amount of advancement of the conveyor during each of its step by step movements to permit the apparatus to handle rail sections having different cross sectional dimensions.

12. Rail transfer apparatus for delivering rail sections one at a time to rail receiving equipment, said apparatus comprising storage means including a movable conveyor for supporting a row of rail sections in side by side relationship with their flat base portions resting on said conveyor, a transfer device including a plate movable in an orbital path about a predetermined horizontal axis so that during a complete cycle the plate moves between a retracted position where it is out of engagement with the rail sections to an advanced position where it lifts one of the rail sections from the storage means and deposits the removed section with its flat base portion resting on the rail receiving equipment and then returns to the retracted position, and a common drive means for moving the transfer device and for driving said conveyor, said common drive means including structure for driving said conveyor for only a portion of the cycle of the transfer device in order to move the row of rail sections after the transfer device removes said one rail section, said structure being effective to prevent the drive means from driving the conveyor for the remaining portion of the cycle.

13. Rail transfer apparatus for delivering rail sections one at a time to rail receiving equipment, said apparatus comprising storage means including a movable conveyor for supporting a row of rail sections in side by side relationship with their flat base portions resting on said conveyor, stop means for engaging the end rail section in the row in order to position the entire row upon the storage means, a transfer device including a plate movable in an orbital path about a predetermined horizontal axis so that in a complete cycle said plate moves between a retracted position where it is out of engagement with the rail sections to an advanced position where it lifts the rail section engaged by the stop means from the storage means and deposits the removed section with its flat base portion resting on the rail receiving equipment and then returns to the retracted position, and a common drive means for moving the transfer device and for driving said conveyor, said common drive means including structure for driving said conveyor for only a portion of the cycle of the transfer device in order to advance the row of rail sections until the new end rail section engages the stop means, said structure being effective to prevent the drive means from driving the conveyor for the remaining portion of the cycle.

14. The apparatus defined by claim 13 wherein means are provided for adjusting the position of the stop means along the path of advancement of the row of rail sections in order to permit the apparatus to handle rail sections having different cross sectional dimensions.

15. Method of storing sections of rail and transferring said rail to a rail receiving device, comprising the steps of placing rail sections with their flat base portions resting on a storage bed side by side and with their longitudinal axes extending generally parallel to the rail receiving device, moving the thus placed rail sections along said storage bed in unison, stopping said movement of the rail sections when they are positioned in a contiguous side by side row with the end-most rail adjacent a conveyor extending longitudinally of said end-most rail, lifting said end-most rail from its said position and depositing it onto said conveyor with its flat base remaining parallel with the storage bed during the lifting and with the flat base portion resting on the conveyor following the lifting, and again moving the supply of continuous side by side rails on said bed so that an end-most rail is again in position adjacent said conveyor.

16. Method according to claim 15, including the step of moving the rail on said conveyor into the rail receiving device.

17. Method according to claim 16, in which said endmost rail on the bed is moved in an arc from its said position onto said adjacent conveyor.

References Cited in the file of this patent

UNITED STATES PATENTS

| | | |
|---|---|---|
| 1,838,167 | Wheeler | Dec. 29, 1931 |
| 2,162,138 | Tuthill et al. | June 13, 1939 |
| 2,206,766 | Cushnie | July 2, 1940 |
| 2,366,615 | Hansen | Jan. 2, 1945 |
| 2,623,626 | Ditolla | Dec. 30, 1952 |

FOREIGN PATENTS

| | | |
|---|---|---|
| 667,892 | Great Britain | Mar. 12, 1952 |

UNITED STATES PATENT OFFICE
CERTIFICATE OF CORRECTION

Patent No. 3,039,585　　　　　　　　　　　　　　June 19, 1962

Norman L. Francis

It is hereby certified that error appears in the above numbered patent requiring correction and that the said Letters Patent should read as corrected below.

Column 9, lines 34 to 36, strike out "and including means thereon for engaging the underside of the flat base portion of the rail sections" and insert the same after "bed" in line 37, same column 9.

Signed and sealed this 2nd day of October 1962.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,039,585                    June 19, 1962

Norman L. Francis

It is hereby certified that error appears in the above numbered patent requiring correction and that the said Letters Patent should read as corrected below.

Column 9, lines 34 to 36, strike out "and including means thereon for engaging the underside of the flat base portion of the rail sections" and insert the same after "bed" in line 37, same column 9.

Signed and sealed this 2nd day of October 1962.

(SEAL)
Attest:

ERNEST W. SWIDER
Attesting Officer

DAVID L. LADD
Commissioner of Patents